US005657667A

United States Patent [19]
Noga et al.

[11] Patent Number: 5,657,667
[45] Date of Patent: Aug. 19, 1997

[54] END OF TRAVEL STOP FOR TRANSFER CASE ACTUATOR

[75] Inventors: Marc Noga, Ann Arbor, Mich.; Robert Hall, Berkey, Ohio

[73] Assignee: United Technologies Motor Systems, Inc., Columbus, Miss.

[21] Appl. No.: 573,562

[22] Filed: Dec. 15, 1995

[51] Int. Cl.$^6$ ............... F16H 1/16; F16H 59/02
[52] U.S. Cl. ............... 74/425; 74/335; 74/526
[58] Field of Search ............... 74/89.14, 425, 74/335, 526; 192/148, 149

[56] References Cited

U.S. PATENT DOCUMENTS

| | | | |
|---|---|---|---|
| 2,223,997 | 12/1940 | Lorentzen | 74/425 X |
| 2,766,638 | 10/1956 | Vice | 74/425 |
| 3,398,590 | 8/1968 | Campbell et al. | 74/89.14 |
| 3,448,624 | 6/1969 | Brown | 74/526 X |
| 3,490,307 | 1/1970 | Jetter | 74/526 X |
| 4,664,217 | 5/1987 | Welch et al. | |
| 5,062,135 | 10/1991 | Ohike | 74/526 X |
| 5,407,024 | 4/1995 | Watson et al. | |
| 5,409,429 | 4/1995 | Showalter et al. | |

*Primary Examiner*—Allan D. Herrmann
*Attorney, Agent, or Firm*—Howard & Howard

[57] ABSTRACT

A vehicle transfer case for changing between two- and four-wheel modes of operation has a transmission with an inventive stop. The stop extends radially outwardly beyond the nominal height of gear teeth on a worm gear in the transmission. The stop engages a worm which is part of the transmission at a location outside of a primary contact area between the worm and worm gear. When the stop contacts the worm it stops further rotation of the worm gear. The motor for the worm gear is reversible such that both the worm and worm gear can rotate in either direction. A single stop defines two circumferentially spaced ends of travel. Since the stop contacts a moving surface on the worm, there is a reduced likelihood of seizure when compared to the prior art.

21 Claims, 2 Drawing Sheets

END OF TRAVEL STOP FOR TRANSFER CASE ACTUATOR

BACKGROUND OF THE INVENTION

This application relates to a transmission for driving an actuator for a vehicle transfer case wherein a unique stop defines ends of travel for the transmission.

Transfer cases allow a vehicle to be switched between two-wheel and four-wheel drive. In addition, such transfer cases also typically allow both high and low gear ratios.

To provide the above modes of operation, a plurality of shift collars are moved between locations wherein they drive one or two axles and either high or low gear ratios. An actuator assembly typically includes a motor driving a worm. The worm engages a worm gear, and a shaft is attached to the worm gear. An actuator pin is driven by the shaft to move the shift collars between several positions at which the various drive modes are provided.

In one example, the worm must drive the worm gear through a range of approximately 270° to provide the modes of operation. A groove in the shaft moves the actuator pin between any one of several distinct axial positions. In the axial positions, the pin actuator moves shift collars between locations wherein one or two axles are driven, and also between high and low gear ratios. By selectively rotating the worm gear, one can move the pin to a desired location. The motor is preferably a reversible motor such that the actuator pin can be moved back and forth between the positions.

Problems have arisen with such transmission in the prior art. In particular, it is undesirable to allow the worm gear to rotate beyond 360°. If the worm gear approaches 360° of rotation, then the actuator pin or shift collar can lock the system. In the past, this has sometimes occurred and an operator is unable to change the mode of operation. This would, of course, be undesirable.

To that end, a stop has been provided on the worm gear to prevent rotation from approaching 360°. In one prior art example, a stop pin extends axially from a face of the worm gear and contacts a stop surface within the worm gear housing to limit the gear to approximately 330° of rotation. In this way, the stop pin prevents the gear from approaching 360° of rotation.

In the prior art systems, the angular motion typically required to achieve the required movement of the actuator pin is smaller than that allowed by the stop. In the prior art systems, only 270° of rotation is necessary to actuate or move the actuator pin between all axial positions, while the worm gear has a 330° of range. Thus, the stop is typically not actuated, as the transmission should in theory never approach the extremes of the stop. A position feedback member is utilized to stop the worm gear at the 270°.

However, in practice it does happen that the worm gear occasionally reaches the end of its range of travel and the stop is required. In the past, the stop has sometimes wedged into the housing structure and lobe the worm gear. This is undesirable.

SUMMARY OF THE INVENTION

In a disclosed embodiment of this invention, a stop is formed on a radially outer surface of the worm gear. Preferably, the stop is formed to extend a greater radial distance than the height of the teeth on the worm gear. Most preferably, the stop is positioned such that it selectively contacts a surface on the worm to define the two ends of travel for the transmission.

In a most preferred embodiment, the contact between the stop and the worm is in an area outside the main area of engagement between the worm and the worm gear. Since the stop contacts the moving worm gear, there is less likelihood that the stop will be wedged into the gear. Rather, the relatively moving surfaces are unlikely to become wedged together.

One main advantage of having the stop on the outer periphery of the worm gear is that it contacts a stop surface on the worm. The worm gear is typically formed of a hardened material, and it is unlikely that the stop will be able to dig into the stop surface on the worm. Moreover by contacting the worm a lower torque must be overcome as the worm shaft will stall the motor once the stop engages.

In one embodiment, a thread portion on the worm is removed to provide the stop surface. Edges of the remaining thread portion contact the stop, which can thus easily stop the worm.

In a method according to the present invention, a stop is formed on an outer surface of the worm gear. The motor is utilized to drive the worm and rotate the worm gear in response to a controller for the transfer case. Upon rotation of the worm gear, an actuator pin is moved between positions wherein it achieves selected modes of operation for the vehicle transfer case. If the worm gear rotates beyond the range necessary for normal operation of the actuator pin, the stop engages the stop surface. At that time, the stop will prevent further rotation of the worm gear.

These and other features of the present invention can be best understood from the following specification and drawings, of which the following is a brief description.

BRIEF DESCRIPTION OF THE DRAWINGS

FIG. 4 shows an alternate stop surface.

FIG. 5 is a cross-sectional view along line 5—5 as shown in FIG. 4.

DETAILED DESCRIPTION OF A PREFERRED EMBODIMENT

Figure 1:
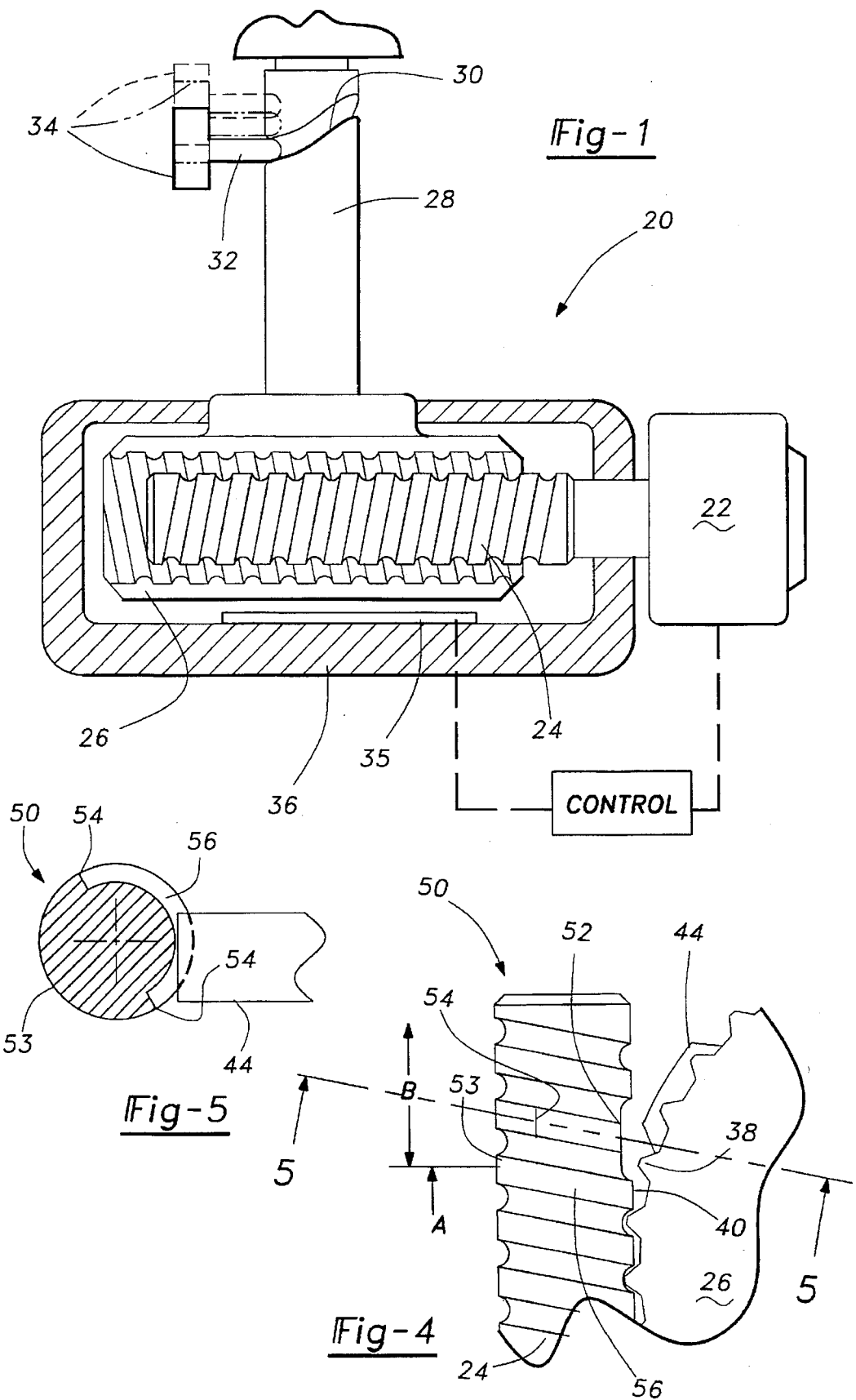
FIG. 1 is a schematic view of a transfer case actuation system.

A transfer case actuation system 20 is illustrated in FIG. 1. A motor 22, which may be a DC motor, selectively drives a worm 24. Worm 24 engages teeth on a worm gear 26. Motor 22 is preferably reversible, and upon rotation of worm 24, the worm gear 26 rotates. Worm gear 26 drives a shaft 28. As shown schematically, shaft 28 may include a cam groove 30. An actuator pin 32 is received within cam groove 30. A shift collar system 34 is shown schematically being driven by pin 32. As is known, upon rotation of the shaft 28, the cam groove 30 causes axial movement of the pin 32, and thus movement of the collar system 34 between several axial positions. The positions are shown schematically in this Figure, and the structure of the groove 30, the pin 32, and the collar system 34 form no portion of this invention. Upon movement of the collar system 34 between the several positions, gearing associated with the collar system is engaged to provide two- or four-wheel drive, and also high or low gear ratios.

The rotation of the shaft 30 does not require 360° to achieve all of the required movement of the actuator pin 32. In fact, it would be undesirable to have 360° of rotation. In the prior art, it is typical that only 270° of rotation is required to achieve all necessary movement of the actuator pin 32. The motor 22 is typically one that rotates through 360°. The transmission between worm 24 and worm gear 26 typically prevents rotation through 360°, as such rotation would be undesirable. To that end, a stop has been provided in the prior art to prevent rotation of the worm gear 26 as it approaches 330° of rotation. As can be seen, more rotation is allowed by the stop than is required to move the pin 32 as necessary. It should be understood that the above angular ranges are examples, and that actual ranges may differ.

A position feedback member 35 is shown schematically, and monitors the movement of the worm gear 26. Position feedback member 35 may be of any known type. Position feedback member 35 is associated with the control for motor 22, and also the overall transfer case system. Member 35 is intended to limit rotation of worm gear 26 to that necessary for movement of the actuator pin (i.e. 270°). A housing 36 receives the worm gear 26 and member 35.

Figure 2:
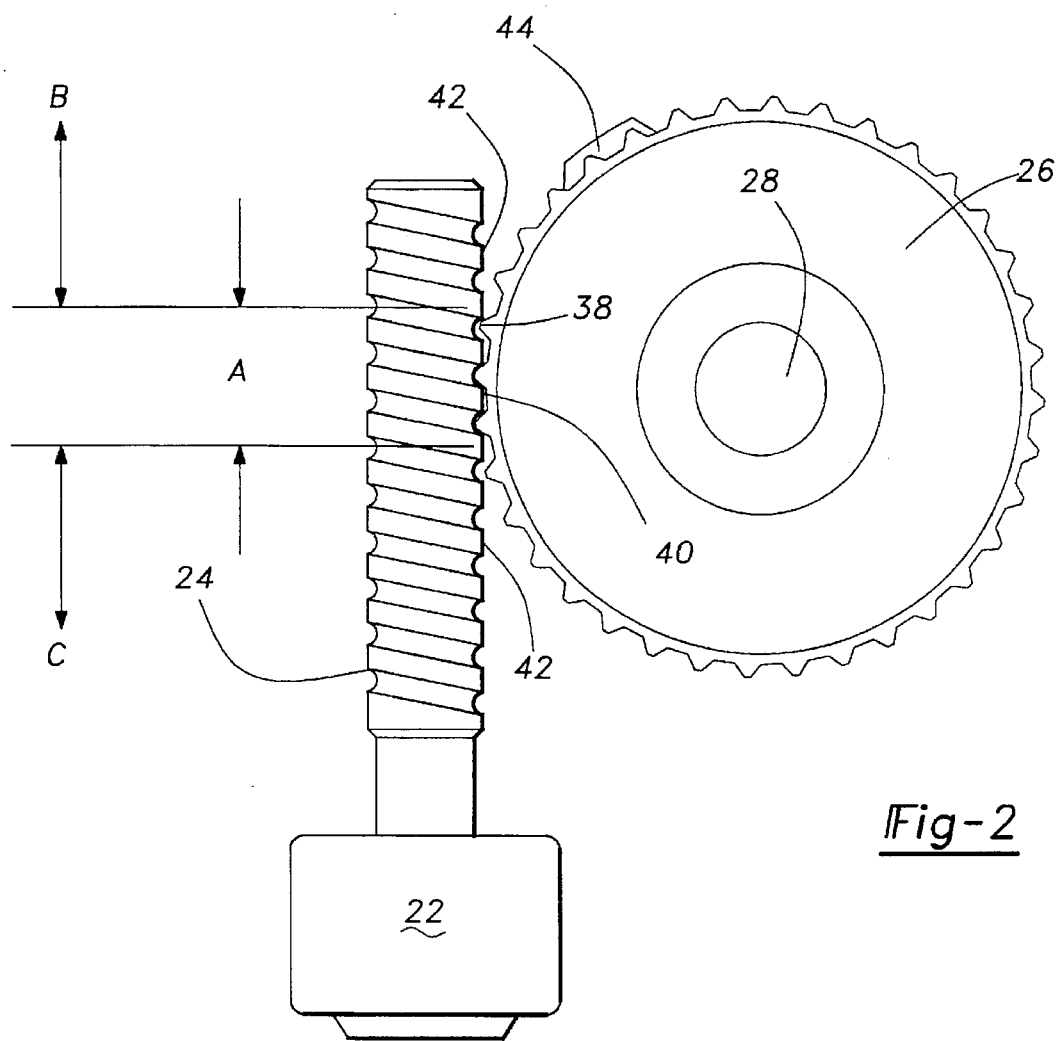
FIG. 2 is a view of the inventive transmission.

As shown in FIG. 2, the worm gear 26 has a primary engagement area A wherein its gear teeth 38 engage the gear teeth 40 of the worm 24. Stop contact areas 42 on worm 24 are defined adjacent each side of main engagement area A. A stop 44 extends radially outwardly from a location on the worm gear 26, and beyond the height of gear teeth 38.

As should be understood, during normal operation of the transfer case actuation system 20, the worm 24 is driven by the motor 22, and the worm gear 25 rotates. The actuator pin 32 moves within cam 30 due to the rotational position of the shaft 28. During this operation, the worm gear may move in either rotational direction about the axis of shaft 28. The position feedback member 35 monitors the position of worm gear 26 and communicates with the control for motor 22 to stop rotation once the desired position is reached. In the past, it has sometimes occurred that the control has not stopped the worm gear at the range of travel necessary for operation of the actuator pin 32 (i.e. at 270°). Thus, a stop has been provided in the prior art to prevent movement of the worm gear 26 from approaching 360 degrees of rotation.

In the instant invention, the stop 44 is formed on the outer peripheral surface of the worm gear 26, and contacts a moving surface 42 on worm 24 in either area B or area C, depending upon the direction of rotation of worm gear 26. The moving stop surface reduces the likelihood of locking or seizure of the worm 24 and worm gear 26.

Figure 3:
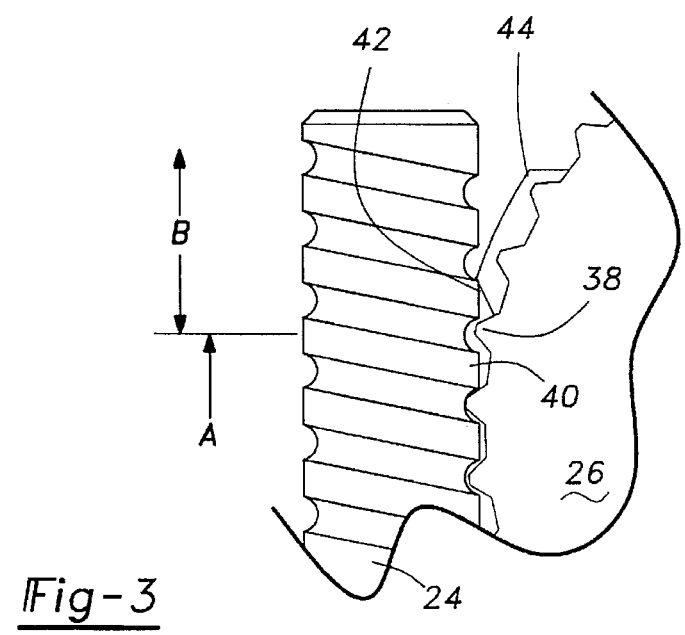
FIG. 3 shows the transmission of FIG. 2 in a stop position.

As shown in FIG. 3, when there is undue rotation of the worm gear 26, the stop 44 contacts the surface 42 in the area B. Stop 44 prevents further rotation of worm gear 26. During this contact, the worm 24 continues to rotate. Even though the stop 44 may be driven towards the worm 24, the moving surfaces of surface 42 and stop 44 reduce the likelihood of any engagement between the two. As such, the likelihood of seizure is reduced due to the use of this inventive stop.

Another advantage of the inventive structure is that the worm 24 is typically formed of a hardened material. Thus, it is unlikely that the stop 44 will be able to lodge itself into the hardened worm 42, reducing the likelihood of seizure. The prior art stop would contact the relatively soft housing.

Should the motor be reversed, the stop 44 will also contact the surface area 42 at a location spaced approximately 330° from that shown in FIG. 3. Thus, stop 44 defines an end of travel range for the worm gear 26 having two circumferentially spaced ends.

FIGS. 4 and 5 show a further refinement of the inventive concept. As shown in FIG. 4, the worm 50 is modified such that the stop surface 52 includes a partially removed thread portion. The remaining portion 53 of the removed gear tooth has ledges 54 at two spaced locations. It should be understood that a similar removed thread portion would be found in the opposed stop surface area C. The stop 44 can now move into the area 56 of the removed thread portion, and upon further rotation of the thread 53, the ledge 54 will contact stop 44. At that time, stop 44 will prevent further rotation of the worm 50, thus stalling the motor. The force necessary to stall the worm 24 is much less than that necessary to stall the worm gear 26, and thus a lower force is required for this inventive stop.

As shown in FIG. 5, there are two opposed stops 54. The removed portion 56 preferably extends to the nominal root of the worm 50. As shown, the stop 44 is being approached by the ledge 54. Once the two contact, further rotation of the worm 50 will be prevented.

In a method according to the present invention, a stop is provided on a worm gear for a vehicle transfer case actuator. The stop is positioned such that it will engage a moving surface on the worm gear. In a most preferred embodiment, the surface is a toothed surface on the worm. The stop contacts the worm surface when the worm surface is still moving, reducing the likelihood of seizure.

Preferably, the stop is molded with the worm gear. The worm gear may be formed of a powdered metal.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A motor and transmission assembly comprising:
   a reversible electric motor driving a worm having a thread;
   a worm gear having teeth engaged with said thread on said worm at a primary contact surface, said worm gear having a stop extending radially outwardly beyond the height of said gear teeth for preventing rotation of said worm gear from approaching 360°;
   said stop contacting a stop surface to prevent further rotation of said worm gear at two circumferentially spaced ends of travel; and
   said stop surface being positioned outside of said primary contact surface.

2. An assembly as recited in claim 1, wherein said stop surface is on said worm.

3. An assembly as recited in claim 2, wherein said stop surface on said worm includes a partially removed thread portion.

4. An assembly as recited in claim 3, wherein said partially removed thread portion extends between two ledge portions of said thread, said ledge portions contacting said stop to prevent further rotation.

5. An assembly as recited in claim 1, wherein a single stop on said worm gear defines two end of travel locations at two circumferential extremes for said worm gear.

6. An assembly as recited in claim 1, wherein a position feedback member monitors the location of said worm gear and communicates with a control.

7. An assembly as recited in claim 6, wherein said position feedback member communicates with said control to stop further rotation of said worm gear after a range of rotation that is less than the range of rotation at which said stop contacts said stop surface.

8. An actuator for a transfer case of a vehicle comprising:
   a motor for driving a first gear, said first gear engaging and driving a second gear, a shaft being driven by said second gear, said shaft moving an actuator for a vehicle transfer case, the rotational position of said shaft causing movement of said actuator to achieve a selected mode of operation for a transfer case; and said second gear having a stop extending radially outwardly from an outer surface, and beyond the nominal height of gear teeth on said second gear, said stop defining two ends of a range of travel that are spaced circumferentially by less than 360°, and said stop contacting stop surfaces at said ends.

9. An assembly as recited in claim 8, wherein said stop surfaces are formed on said first gear.

10. An assembly as recited in claim 9, wherein said stop surfaces are outside of a primary surface wherein said first gear engages said second gear teeth for driving said second gear.

11. An assembly as recited in claim 9, wherein said stop surface on said first gear which is contacted by said stop includes gear teeth.

12. An assembly as recited in claim 11, wherein said stop surface includes a partially removed gear tooth portion, said partially removed portion defining ledges at remaining gear teeth portions, and said ledges contacting said stop to prevent rotation.

13. An assembly as recited in claim 9, wherein a single stop on said second gear defines said two ends of travel.

14. An assembly as recited in claim 8, wherein said motor is a D.C. motor.

15. An assembly as recited in claim 8, wherein a position feedback member monitors the location of said second gear and communicates with a control.

16. An assembly as recited in claim 15, wherein said position feedback member communicates with said control to stop further rotation of said second gear once a selected range of travel is reached.

17. An assembly as recited in claim 8, wherein said first gear is a worm and said second gear is a worm gear.

18. An assembly as recited in claim 16, wherein said selected range of travel limits rotation of said gear from reaching either of said two ends.

19. An assembly as recited in claim 17, wherein said worm has a thread which engages said gear teeth on said worm gear, said stop surfaces being formed on said worm, and said worm thread engaging said gear teeth on said worm gear at a primary contact surface, said stop surfaces being defined outside of said primary contact surface.

20. An assembly as recited in claim 18, wherein said stop contacts a moving stop surface on said first gear.

21. A method of operating an actuator for a vehicle transfer case comprising the steps of:

(1) providing a motor driving a first gear, said first gear engaging gear teeth on a second gear at a primary contact zone, said second gear driving a shaft, said shaft controlling movement of an actuator to move a vehicle transfer case between positions providing two and four-wheel modes of operation for a vehicle;

(2) operating said motor to drive said second gear, the rotation of said second gear being limited to a range of less than 360°; and (3) providing a stop on said second gear extending beyond the nominal height of said gear teeth on said second gear, said stop contacting said first gear outside of said primary contact zone when said second gear is rotated beyond said ends of travel.

* * * * *